May 19, 1942.　　　C. W. SINCLAIR　　　2,283,654
BRAKE
Filed July 1, 1940　　　2 Sheets-Sheet 1
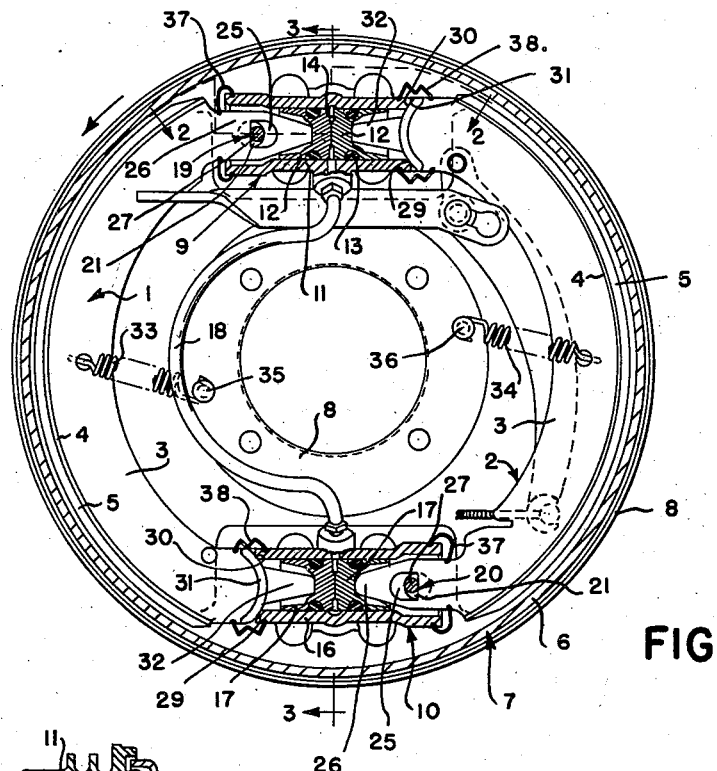
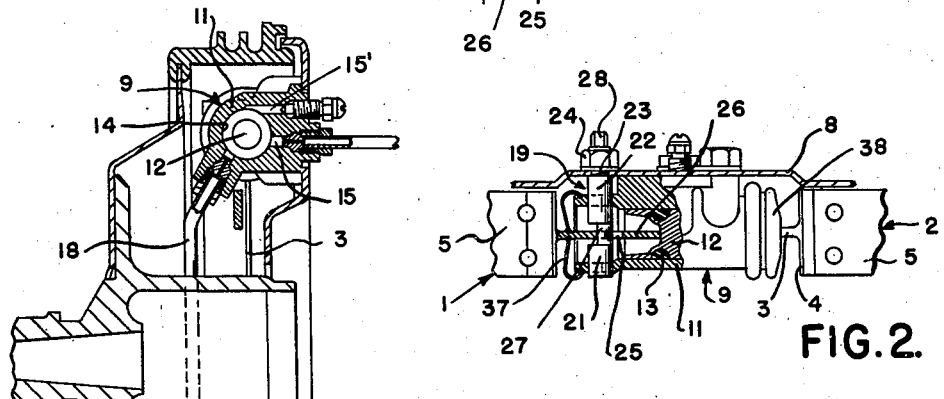
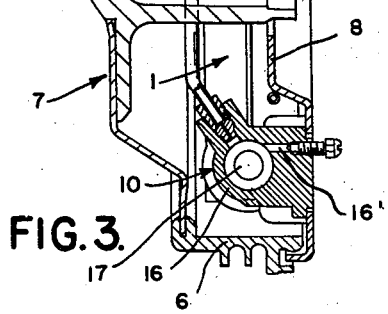
FIG.3.
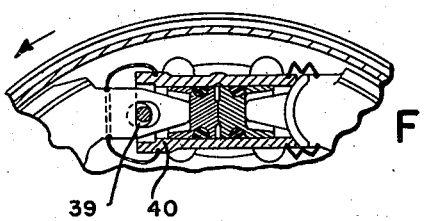
FIG.4.
INVENTOR.
CHARLES W. SINCLAIR
BY
ATTORNEYS May 19, 1942.                    C. W. SINCLAIR                    2,283,654
                                      BRAKE
                              Filed July 1, 1940                2 Sheets-Sheet 2
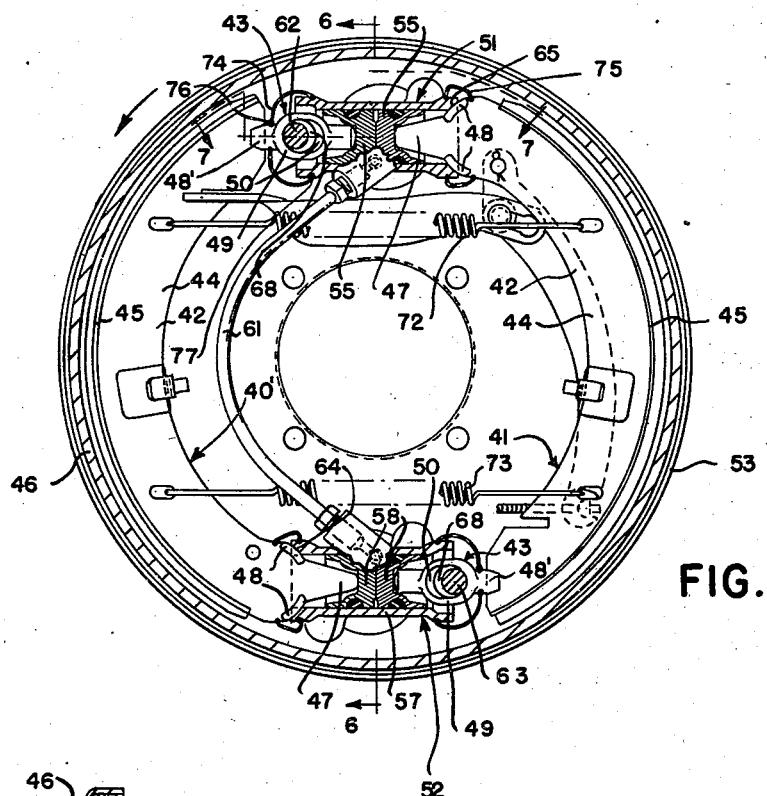
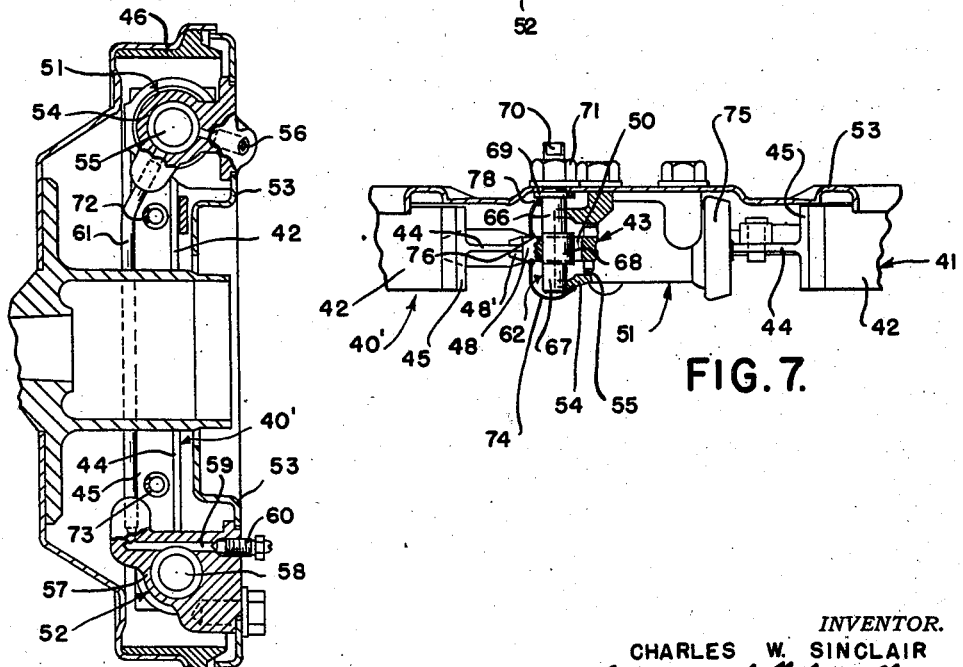
INVENTOR.
CHARLES W. SINCLAIR
BY
ATTORNEYS Patented May 19, 1942

2,283,654

UNITED STATES PATENT OFFICE 2,283,654

BRAKE

Charles W. Sinclair, Detroit, Mich., assignor to Kelsey-Hayes Wheel Company, Detroit, Mich., a corporation of Delaware Application July 1, 1940, Serial No. 343,476

8 Claims. (Cl. 188—152)

The invention relates to brakes and refers more particularly to motor vehicle brakes.

The invention has for one object to provide an improved anchor for a brake friction element constructed to readily resist the braking torque to which it is subjected.

The invention has for other objects to provide an improved construction of brake comprising a pair of brake friction elements which are individually movable to anchor on different parts according to the direction of rotation of the member to be braked; to provide improved means for anchoring the different parts; and to provide a simple construction for normally maintaining the different parts in engagement with their anchors.

The invention has for further objects the novel arrangements and combinations of parts, as more fully hereinafter set forth.

In the drawings:

Figure 1 is a sectional elevation illustrating a brake embodying my invention;

Figures 2 and 3 are cross sections on the lines 2—2 and 3—3, respectively, of Figure 1;

Figure 4 is a view similar to a portion of Figure 1, showing another embodiment of my invention;

Figure 5 is a view similar to Figure 1, showing another embodiment of my invention;

Figures 6 and 7 are cross sections on the lines 6—6 and 7—7, respectively, of Figure 5.

As illustrated in Figures 1, 2 and 3, the brake friction means comprises the brake friction elements or brake shoes 1 and 2 which are alike and interchangeable and have the upper and lower ends separated. Each brake shoe is of T-section and has the radially extending web 3 and the axially extending flange 4, the latter having secured to its outer face the brake lining 5. The brake linings are engageable with the brake flange 6 of the brake drum 7 which may be of usual construction and is secured to a motor vehicle wheel. 8 is the backing plate which is secured to either the rear axle housing or the steering spindle of the motor vehicle.

For spreading apart both the upper and lower ends of the brake shoes, the upper and lower wheel cylinders 9 and 10, respectively, are provided. The upper wheel cylinder comprises the cylinder 11 secured to the backing plate 8 and the opposed pistons 12 within the cylinder having the outer sides of their heads abutting the upper ends of the brake shoes. The pistons, as shown, are cup-shaped and are provided with the sealing rings 13 which are preferably formed of rubber and which slidably engage the wall of the cylinder. The inner sides of the piston heads in the retracted positions of the pistons cooperate to form the annular groove 14 which communicates with the passageway 15 for the braking liquid and also with the bleed passageway 15', the latter being closed by a suitable plug when the brake is in operative condition. The lower wheel cylinder 10 comprises the cylinder 16 secured to the backing plate 8 and opposed pistons 17 within the cylinder and having the outer sides of their heads abutting the lower ends of the brake shoes. The pistons 17 are formed in the same manner as the pistons 12. The cylinder 16 is formed with the bleed passageway 16' which is normally closed by a plug. 18 is a generally U-shaped pipe for placing the interiors of the wheel cylinders in communication with each other so that both wheel cylinders will be operated at the same time. In the brake, as shown, the direction of rotation of the brake drum 7 is counterclockwise, as indicated by the arrow in Figure 7, when the motor vehicle is moving in a forward direction, which is normal. The normally leading ends of the shoes in their retracted positions engage the anchors 19 and 20, respectively, while the normally trailing ends of the shoes engage anchors formed at the ends of the lower and upper wheel cylinders respectively.

The anchors 19 and 20 are alike and each is formed of a pin extending transversely through the backing plate 8 and the adjacent cylinder near one end of the latter. Each pin has the longitudinally spaced cylindrical portions 21 and 22 which are journaled in the cylinder and the reduced externally threaded portion 23 which extends through an opening in the backing plate and is engaged by the nut 24 for clamping the pin to the backing plate. Each pin also extends through the elongated opening 25 in the extension 26 of the web 3 at its leading end, the extension being of a size to extend freely within the cylinder and to abut the outer face of the associated piston head. The portion 27 of the pin extending within the opening is of cylindrical cross section with its axis eccentric to that of the pin. As a result, clearance between the brake flange and lining may be taken up as the lining wears by rotatably adjusting the pin. This is facilitated by forming the end of the pin beyond its reduced portion with the polygonal-shaped portion 28 adapted for engagement by a suitable tool, such as a wrench.

The opposite end of each cylinder is formed with the annular arcuate face 29 having a radius of curvature about a center in the axis of the cylinder. The face forms the arcuate inner bearing surfaces 30 which are engageable with the radially spaced bearing portions 31 formed by upset portions on the brake shoe webs extending transversely from their opposite sides near their normally trailing ends. These ends are formed with the extensions 32 which are of a size to extend within the wheel cylinders and abut the outer faces of the adjacent piston heads.

With this construction, the shoes 1 and 2 individually float and are individually movable to anchor either on the adjustable anchors 19 and 20 in one direction of rotation of the brake drum, or on the fixed anchors formed at the ends of the wheel cylinders in the opposite direction of rotation of the brake drum. Also, the adjustment of the brake shoes to take up wear of the linings is carried out at the leading ends of the brake shoes in the normal operation of the brakes.

33 and 34 are tension coil springs having their generally radially outer ends connected to the webs of the brake shoes 1 and 2 midway of their ends. The generally radially inner ends of the coil springs are connected to the pins 35 and 36, respectively, upon the backing plate 8, these pins being positioned so that the coil spring 33 from its point of connection with the brake shoe 1 is inclined both toward the backing plate 8 and the wheel cylinder 10 and the coil spring 34 is inclined both toward the backing plate 8 and the wheel cylinder 9. As a result, these two single coil springs, in addition to normally maintaining the brake shoes against their anchors, normally maintain the normally trailing ends of the brake shoes against the fixed anchors while permitting their normally leading ends to be moved away during the operation of the brakes and during the forward movement of the motor vehicle.

For sealing the ends of the wheel cylinders, there are the flexible sealing members or boots 37 and 38 which are preferably formed of rubber and have beads at one end engaging in grooves in the cylinders and beads at the other end engaging in grooves in the extensions of the brake shoe webs.

In the modification illustrated in Figure 4, the adjustable anchor pin also has longitudinally spaced bearing portions engaging diametrically opposite portions of the wall of the cylinder. However, the construction is different in that the openings 39 formed in diametrically opposite portions of the cylinder 40 are semi-circular, instead of circular. As a result, the spaced bearing portions of the anchoring pin extend beyond the end of the cylinder. However, this anchoring construction is at least as strong as that of Figures 1 to 3, inclusive, inasmuch as the braking torque which is resisted by these adjustable anchors is in a direction toward the cylinders.

Figures 5, 6 and 7 illustrate another embodiment of my invention in which the brake friction means comprises the brake friction elements 40' and 41 which are alike and interchangeable and have separated upper and lower ends. Each friction element comprises the brake shoe 42 and the link 43. The brake shoe is of T-section and has the radially extending web 44 and the axially extending flange 45, to which latter the brake lining is secured. The brake linings are engageable with the brake flange 46 of the brake drum which may be of usual construction and is secured to a motor vehicle wheel.

Each brake shoe is formed at one end of its web with the extension 47 of reduced width or radial extent and with the upset bearing portions 48 at the inner end of the extension. The bearing portions are arcuate and have the same radius of curvature. Each link 43 has a slotted end providing the furcations 48' for embracing the end of the web of the associated brake shoe opposite the extension. Each link also has intermediate its ends the enlarged portion 49 formed with the elongated opening 50.

The upper and lower ends of the friction elements are adapted to be spread apart by the upper and lower wheel cylinders 51 and 52, respectively, both of which are secured to and mounted upon the backing plate 53. The upper wheel cylinder comprises the cylinder 54 and the opposed pistons 55 within the cylinder with the outer side of the head of one piston abutting the inner end of the link 43 of the friction element 40' and the outer side of the head of the other piston abutting the end of the extension 47 of the shoe 42 of the other friction element. Both of these pistons are provided with sealing rings corresponding to the sealing rings 13 of Figures 1, 2 and 3. The cylinder 54 is provided with the passageway 56 for the braking liquid. The lower wheel cylinder 52 comprises the cylinder 57 and the opposed pistons 58 within the cylinder with one piston directly operable upon the link of the friction element 41 and the other piston directly operable upon the extension of the shoe of the friction element 40'. The lower cylinder is formed with the bleed passageway 59 adapted to be closed by a suitable plug 60 when the brake is in operative condition. The pistons 58 are formed in the same manner as the pistons 55. 61 is a generally U-shaped pipe for placing the interiors of the wheel cylinders in communication with each other. By reason of the small braking liquid capacity in the wheel cylinders when the brake is in off position and in the pipe connecting the wheel cylinders, air can be readily forced out by the braking liquid when forced in.

In the brake, as shown, the direction of rotation of the brake drum is counterclockwise, as indicated by the arrow in Figure 5, when the motor vehicle is moving in a forward direction. The normally leading ends of the friction elements are provided with the links 43 and when the friction elements are in their retracted positions, the outer ends of the openings in these links engage the anchors 62 and 63, respectively, while the upset bearing portions 48 at the normally trailing ends of the brake shoes forming parts of the friction elements 40' and 41 engage the anchors 64 and 65 formed at the ends of the lower and upper wheel cylinders, respectively.

The anchors 62 and 63 are alike and each is formed of a pin extending transversely through the backing plate 53 and the adjacent cylinder at one end of the latter. Each pin has the longitudinally spaced cylindrical portions 66 and 67 which are journaled in substantially half-round openings formed in diametrically opposite portions of the cylinder wall at its end. Each pin also has the eccentric portion 68 which extends through the opening 50 of the associated link 43 and is adapted to abut the outer end of the opening when the brake friction means is in retracted position. In addition, the pin has the enlarged portion 69 which abuts the inside of the backing plate 53 and the portion 70 which extends transversely through the backing plate and is externally threaded to receive the clamping nut 71 and terminates in a polygonal-shaped tool engaging portion. It will thus be seen that these anchors operate in substantially the same manner as the anchors described in connection with the previous figures and that the construction is more substantial to more easily resist the braking torque without deforming the parts, including the brake shoes.

72 and 73 are tension coil springs having their ends connected to the brake shoes near their upper and lower ends, respectively, for normally maintaining the friction elements in their retracted positions.

To seal the ends of the wheels cylinders, there are the flexible sealing members or boots 74 and 75, preferably formed of rubber. The sealing member 74 is located at the leading end of each of the friction elements and has the bead 76 which encircles and closely fits the link 43 between its enlargement and the adjacent end of the brake shoe and also the bead 77 which encircles and closely fits in a groove in the adjacent end of the associated wheel cylinder. The sealing member 74, in addition, has the side bead 78 which encircles and closely fits the cylindrical portion 66 of the anchor pin between the enlarged portion 69 and the wheel cylinder. The sealing member 75 has beads at its opposite ends engaging in grooves in the wheel cylinder and web of the associated shoe beyond its upset bearing portion.

What I claim as my invention is:

1. In a brake, a brake friction element, a backing plate, an actuator for said friction element comprising a housing element on said backing plate and a member movable within said housing element and operable upon said friction element, and an anchor for said friction element extending transversely of and secured to said backing plate and having thrust supporting contact with said housing element.

2. In a brake, a brake friction element, a backing plate, an actuator for said friction element comprising a housing element on said backing plate and a member movable within said housing element and operable upon said friction element, and an anchor for said friction element secured to said backing plate and extending transversely of said housing element and in thrust supporting contact therewith in zones spaced longitudinally of said anchor.

3. In a brake, a a brake friction element having an opening in one of its ends, an actuator for said friction element comprising a housing element and a member movable within said housing element and operable on said end having the opening, and an adjustable anchor for said friction element rotatable about an axis extending transversely of said housing element and in thrust supporting contact therewith and having an eccentric located in the opening and engageable with an end thereof to limit movement of said friction element in one direction.

4. In a brake, a brake shoe having an opening in one end thereof, a wheel cylinder comprising a housing and a piston movable within said housing and engageable with said end of the brake shoe having the opening, and an adjustable anchor for said brake shoe extending transversely of said housing and through the opening and having spaced zones of support on said housing and also having an eccentric portion engageable with an end of the opening to limit movement of said brake shoe in one direction.

5. In a brake, a rotatable brake drum, brake friction means comprising a pair of brake shoes individually movable to anchor on different parts according to the direction of rotation of said brake drum, said brake shoes having webs each with an opening therethrough, anchors extending through the openings and engageable with parts of both brake shoes to resist braking torque of both brake shoes in the same direction, actuators for both brake shoes comprising housings and members movable within said housings for operating both brake shoes in both directions, said housings being provided with anchors engageable with other parts of both brake shoes to resist braking torque of both brake shoes in the direction opposite that in which said first mentioned anchors resist braking torque, and a single spring connected to each of said brake shoes inclined from its point of connection with its associated brake shoe toward the actuator having a housing provided with an associated anchor for normally holding the parts of the brake shoes against their respective anchors and also for normally holding said last mentioned part in engagement with its housing anchor during operation of said actuators with said brake drum rotating in one direction.

6. In a brake, a brake friction element comprising a brake shoe and a link engaging said brake shoe and having an opening, an actuator for said friction element comprising a housing element and a member movable within said housing element and operable on said link, and an adjustable anchor for said friction element rotatable about an axis extending transversely of said housing element and in thrust supporting contact therewith and having an eccentric located in the opening and engageable with an end thereof to limit movement of said friction element in one direction.

7. In a brake, a brake friction element comprising a brake shoe and a link engaging said brake shoe and having an opening therethrough, a wheel cylinder comprising a housing and a piston movable within said housing and engageable with said link, and an adjustable anchor for said friction element extending transversely of said housing and through the opening and having spaced zones of support on said housing and also having an eccentric portion engageable with an end of the opening to limit movement of said friction element in one direction.

8. In a brake comprising a member to be braked, a friction element engageable with said member, a backing plate, and an actuator for said friction element comprising a housing element on said backing plate and a member movable within said housing element and operable upon said friction element, an adjustable eccentric anchor having axially aligned portions extending transversely through said backing plate and secured thereto and in thrust supporting contact with said housing element, and an eccentric portion for anchoring said friction element.

CHARLES W. SINCLAIR.